United States Patent
Masugi

(10) Patent No.: US 9,204,051 B2
(45) Date of Patent: Dec. 1, 2015

(54) IMAGE PICKUP APPARATUS, IMAGE PICKUP METHOD, AND NON-TRANSITORY COMPUTER-READABLE MEDIUM

(71) Applicant: OLYMPUS IMAGING CORP., Shibuya-ku, Tokyo (JP)

(72) Inventor: Tatsuro Masugi, Akiruno (JP)

(73) Assignee: OLYMPUS CORPORATION (JP)

( * ) Notice: Subject to any disclaimer, the term of this patent is extended or adjusted under 35 U.S.C. 154(b) by 0 days.

(21) Appl. No.: 14/184,941

(22) Filed: Feb. 20, 2014

(65) Prior Publication Data

US 2014/0240577 A1   Aug. 28, 2014

(30) Foreign Application Priority Data

Feb. 22, 2013   (JP) .................................. 2013-033569

(51) Int. Cl.
*H04N 5/222*   (2006.01)
*H04N 5/232*   (2006.01)
*H04N 5/262*   (2006.01)

(52) U.S. Cl.
CPC ....... *H04N 5/23293* (2013.01); *H04N 5/23216* (2013.01); *H04N 5/2621* (2013.01)

(58) Field of Classification Search
CPC .......... H04N 1/00442; H04N 1/00453; H04N 1/00456; H04N 1/2125
USPC ............... 348/240.2, 333.05, 333.11, 333.12, 348/333.01, 333.02
See application file for complete search history.

(56) References Cited

U.S. PATENT DOCUMENTS

| | | | |
|---|---|---|---|
| 6,510,283 B1* | 1/2003 | Yamagishi | 396/55 |
| 7,480,002 B2* | 1/2009 | Goh et al. | 348/333.05 |
| 7,714,926 B2* | 5/2010 | Kobayashi et al. | 348/333.11 |
| 8,009,199 B2* | 8/2011 | Park | 348/211.13 |
| 8,189,087 B2* | 5/2012 | Misawa et al. | 348/333.02 |
| 8,310,582 B2* | 11/2012 | Yoon | 348/333.05 |
| 2010/0302409 A1* | 12/2010 | Matas et al. | 348/231.99 |
| 2012/0162459 A1* | 6/2012 | Cheng | 348/222.1 |

FOREIGN PATENT DOCUMENTS

JP   2004-215157   7/2004

* cited by examiner

*Primary Examiner* — Lin Ye
*Assistant Examiner* — Chriss Yoder, III
(74) *Attorney, Agent, or Firm* — Volpe and Koenig, P.C.

(57) ABSTRACT

An image pickup apparatus includes an image pickup section configured by an image pickup optical system, and an image pickup device for a storage section for temporarily storing image data, a display section, a dividing operation section for instructing that a region to be displayed on the display section is to be divided, and a signal processing control section including at least a display control section, and an image processing section, wherein the signal processing control section performs display control of displaying, on the display section, an image based on the image data, dividing a display region of the display section after receiving a division instruction from the dividing operation section, and causing a second image to be displayed in one of regions obtained by the division, and repeatedly updating/displaying a first image in a display region, of the display section, different from an image display region.

17 Claims, 7 Drawing Sheets

IMAGE PICKUP APPARATUS, IMAGE PICKUP METHOD, AND NON-TRANSITORY COMPUTER-READABLE MEDIUM

CROSS REFERENCE TO RELATED APPLICATION

This application claims the benefit of Japanese Application No. 2013-033569 filed in Japan on Feb. 22, 2013, the contents of which are incorporated herein by this reference.

BACKGROUND OF THE INVENTION

1. Field of the Invention

This invention relates to an image pickup apparatus capable of generating a photomontage based on a plurality of picked-up images, an image pickup method, and a non-transitory computer-readable medium.

2. Description of Related Art

Conventionally, an image display device that is capable of sequentially converting optical images formed by an image pickup optical system into image signals by a photoelectric conversion device or the like and of storing the image signals thus obtained in a storage medium as pieces of image data of a predetermined format, and that reproduces/displays the image data stored in the storage medium as an image, such as an image pickup apparatus, like a digital camera or a camcorder, configured by including, for example, a liquid crystal display (LCD), is put to practical use and is widely used.

As this type of image pickup apparatus, one having a function of easily and automatically generating images of various formats by performing, by a signal processing control section inside the apparatus, various types of data processing on image data acquired by an image pickup operation is being put to practical use.

For example, an image pickup apparatus disclosed in Japanese Patent Application Laid-Open Publication No. 2004-215157 displays a sample image as a guide at the time of acquisition of a plurality of picked-up images related to a specific image pickup target, and enables a user to pick up a series of images according to a pattern by sequentially performing image pickup while looking at the guide display.

SUMMARY OF THE INVENTION

An image pickup apparatus of an aspect of the present invention includes an image pickup section configured by an image pickup optical system for forming an optical image, and an image pickup device for photoelectrically converting the optical image formed by the image pickup optical system and generating first image data, a storage section for temporarily storing the first image data picked up by the image pickup section or second image data picked up in a past, a display section for displaying an image based on the first image data or the second image data stored in the storage section, a dividing operation section for instructing that a region to be displayed on the display section is to be divided, and a signal processing control section including at least a display control section for driving the display section, and an image processing section for performing image signal processing on the first image data or the second image data, wherein the signal processing control section performs display control of displaying, on the display section, an image based on the second image data that is temporarily stored in the storage section, dividing a display region of the display section after receiving a division instruction from the dividing operation section, and also, causing a second image to be displayed in one of regions obtained by the division, and repeatedly updating/displaying a first image acquired by the image pickup section in a display region, of the display section, different from a display region of the second image.

An image pickup apparatus of another aspect of the present invention includes an image pickup section configured by an image pickup optical system for forming an optical image, and an image pickup device for photoelectrically converting the optical image formed by the image pickup optical system and generating image data, a display section for displaying an image based on the image data acquired by the image pickup section, an operation section arranged near the display section, a temporary storage section for temporarily storing the image data acquired by the image pickup section, and a signal processing control section including at least a display control section for driving the display section, and an image processing section for performing image signal processing on the image data acquired by the image pickup section, wherein the signal processing control section performs display control of displaying, on the display section, an image based on the image data that is temporarily stored in the temporary storage section, performing a reduction process on the image that is being displayed on the display section after receiving a predetermined operation on the operation section, and also, displaying, on the display section, a reduced image reflecting a result of the reduction process, and successively updating/displaying an image that is acquired by the image pickup section in a marginal portion, other than a display region of the reduced image, on the display section.

An image pickup method of an aspect of the present invention includes causing, by an image pickup section, an image pickup optical system to form an optical image, and an image pickup device to photoelectrically convert the optical image formed by the image pickup optical system and generate first image data, temporarily storing, by a storage section, the first image data picked up by the image pickup section or second image data picked up in a past, displaying, by a display section, an image based on the first image data or the second image data stored in the storage section, instructing, by a dividing operation section, that a region to be displayed on the display section is to be divided, and causing, by a signal processing control section, a display control section to drive the display section, and an image processing section to perform image signal processing on the first image data or the second image data, wherein the signal processing control section performs display control of displaying, on the display section, an image based on the second image data that is temporarily stored in the storage section, dividing a display region of the display section after receiving a division instruction from the dividing operation section, and also, causing a second image to be displayed in one of regions obtained by the division, and repeatedly updating/displaying a first image acquired by the image pickup section in a display region, of the display section, different from a display region of the second image.

An image pickup method of another aspect of the present invention includes causing, by an image pickup section, an image pickup optical system to form an optical image, and an image pickup device to photoelectrically convert the optical image formed by the image pickup optical system and generate image data, displaying, by a display section, an image based on the image data acquired by the image pickup section, issuing, by an operation section, a predetermined operation instruction, temporarily storing, by a temporary storage section, the image data acquired by the image pickup section, and causing, by a signal processing control section, a display control section to drive the display section, and an image processing section to perform image signal processing on the image data acquired by the image pickup section, wherein the signal processing control section performs display control of displaying, on the display section, an image based on the image data that is temporarily stored in the temporary storage section, performing a reduction process on the image that is being displayed on the display section after receiving a predetermined operation on the operation section, and also, displaying, on the display section, a reduced image reflecting a result of the reduction process, and successively updating/displaying an image that is acquired by the image pickup section in a marginal portion, other than a display region of the reduced image, on the display section.

A program, of an aspect of the present invention, stored in a non-transitory computer-readable medium performs control of causing, by an image pickup section, an image pickup optical system to form an optical image, and an image pickup device to photoelectrically convert the optical image formed by the image pickup optical system and generate first image data, temporarily storing, by a storage section, the first image data picked up by the image pickup section or second image data picked up in a past, displaying, by a display section, an image based on the first image data or the second image data stored in the storage section, instructing, by a dividing operation section, that a region to be displayed on the display section is to be divided, and causing, by a signal processing control section, a display control section to drive the display section, and an image processing section to perform image signal processing on the first image data or the second image data, wherein the signal processing control section performs display control of displaying, on the display section, an image based on the second image data that is temporarily stored in the storage section, dividing a display region of the display section after receiving a division instruction from the dividing operation section, and also, causing a second image to be displayed in one of regions obtained by the division, and repeatedly updating/displaying a first image acquired by the image pickup section in a display region, of the display section, different from a display region of the second image.

A program, of another aspect of the present invention, stored in a non-transitory computer-readable medium performs control of causing, by an image pickup section, an image pickup optical system to form an optical image, and an image pickup device to photoelectrically convert the optical image formed by the image pickup optical system and generate image data, displaying, by a display section, an image based on the image data acquired by the image pickup section, issuing, by an operation section, a predetermined operation instruction, temporarily storing, by a temporary storage section, the image data acquired by the image pickup section, and causing, by a signal processing control section, a display control section to drive the display section, and an image processing section to perform image signal processing on the image data acquired by the image pickup section, wherein the signal processing control section performs display control of displaying, on the display section, an image based on the image data that is temporarily stored in the temporary storage section, performing a reduction process on the image that is being displayed on the display section after receiving a predetermined operation on the operation section, and also, displaying, on the display section, a reduced image reflecting a result of the reduction process, and successively updating/displaying an image that is acquired by the image pickup section in a marginal portion, other than a display region of the reduced image, on the display section.

The advantages of this invention will be further clarified by the following detailed description.

DETAILED DESCRIPTION OF THE PREFERRED EMBODIMENT

Figure 1:
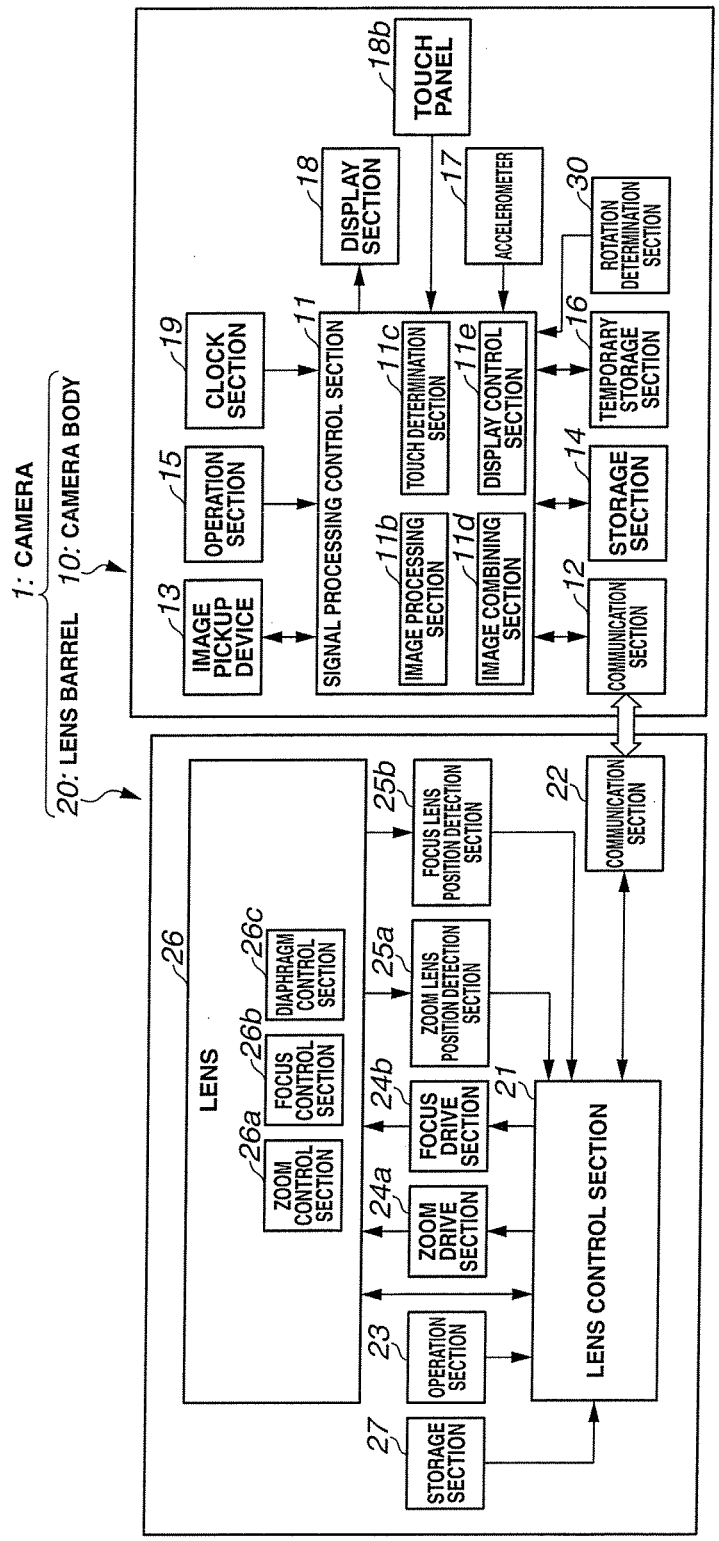
FIG. 1 is a block configuration diagram showing main sections of the internal configuration of an image pickup apparatus of an embodiment of the present invention.

Hereinafter, a preferred embodiment of the present invention will be described with reference to the drawings.

An embodiment of the present invention illustrates an image pickup apparatus (hereinafter referred to simply as "camera") configured to be capable of photoelectrical converting, by using a solid-state image pickup device, an optical image formed by an optical lens or the like, of storing an image signal thus obtained in a storage medium as digital data representing a still image or a movie, and also, of reproducing/displaying the still image or the movie on a display device based on the digital image data stored in the storage medium.

Note that in each of the drawings used in the following description, the scale of display of each structural component may be different such that each structural component is large enough to be recognized in the drawing. Accordingly, the present invention is not restricted to the modes shown in the drawings with respect to the number of structural components, the shapes of the structural components, the proportion of the sizes of the structural components, and the relative positional relationship of respective structural components.

First, a schematic configuration of an image pickup apparatus according to an embodiment of the present invention will be described. FIG. 1 is a block configuration diagram showing main sections of the internal configuration of an image pickup apparatus of an embodiment of the present invention.

As shown in FIG. 1, a camera 1, which is the image pickup apparatus of the present embodiment, is configured by a camera body 10, and a lens barrel 20. The camera 1 is a so-called interchangeable lens camera according to which the lens barrel 20 may be freely attached/detached with respect to the camera body 10. Note that the present embodiment gives a description citing the interchangeable lens camera as an example, but a camera to which the present invention may be applied is not limited to such mode, and application to a camera which is configured by integrating the camera body 10 and the lens barrel 20, for example, is possible in the same manner.

The camera body 10 is configured by including a signal processing control section 11, a body-side communication section 12, an image pickup device 13, a storage section 14, an operation section 15, a temporary storage section 16, an accelerometer 17, a display section 18, a touch panel 18b, a clock section 19, a rotation determination section 30, and the like.

The signal processing control section 11 has a function as a control section for controlling the operation of the camera 1 in an overall manner, and is a circuit section having a function of a signal processing section for processing control signals of various structural units and for performing various types of signal processing and the like on an image signal (image data) acquired by the image pickup device 13.

Various circuit sections are provided inside the signal processing control section 11, such as an image processing section 11b, a touch determination section 11c, an image combining section 11d, a display control section 11e, and the like.

Of the above, the image processing section 11b is a circuit section for performing various types of image processing based on image data acquired by the image pickup device 13.

The touch determination section 11c is a signal processing circuit for receiving an instruction input signal from the touch panel 18b, which is a selection/specification section, and for determining the instruction content. Various types of control at the signal processing control section 11 are performed based on the determination result of the touch determination section 11c.

The image combining section 11d is a circuit section for performing an image combining process of re-generating an image of a different format where images based on a plurality of pieces of image data acquired by the image pickup device 13 are displayed on one screen.

The display control section 11e is a control circuit section for driving the display section 18. The display control section 11e performs control of receiving image data generated and acquired by an image pickup section including the image pickup device 13 and a lens 26 (described below), and of displaying the image data on a display panel of the display section 18 as an image.

The image pickup section mentioned above is a unit configured by including the lens 26 (described below), which is an image pickup optical system that passes light from an object and forms an optical image of the object, and the image pickup device 13 that receives the object image formed by the lens 26 and performs a photoelectric conversion process.

As the image pickup device 13, for example, a photoelectric conversion device, which is a solid-state image pickup device such as an MOS image sensor using a MOS (metal oxide semiconductor) or the like or a CCD image sensor using a circuit element such as a CCD (charge coupled device), is used. An analog image signal generated by the image pickup device 13 is outputted to the signal processing control section 11, and various types of image signal processing are performed at the signal processing control section 11.

The storage section 14 is a structural section configured by including a circuit section for converting an image signal outputted from the image pickup device 13 into a predetermined format, a storage medium for storing image data generated by the circuit section, a control section for driving the storage medium, and the like. The conversion process of an image signal that is performed at this time is a process of conversion into image data of a storing format by a signal compression process or the like, signal processing of restoring an image signal by reading image data stored in the storage medium and performing an extension process thereon, or the like. Note that this type of compression/extension process is not limited to be performed by the storage section 14, and may be performed by the signal processing control section 11, for example.

Figure 2:
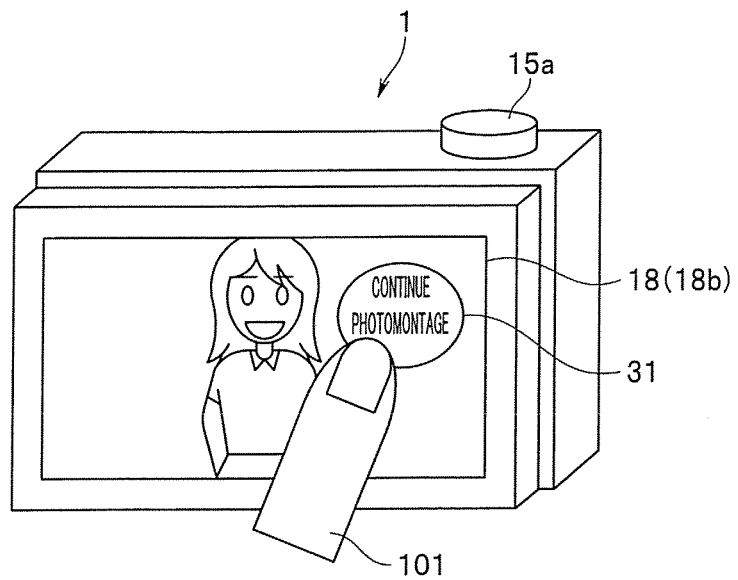
FIG. 2 is a diagram for describing an action at the time of generating a photomontage based on image data acquired by using a camera in FIG. 1, the diagram showing a state immediately after an image pickup operation.

The operation section 15 includes various types of operation members, such as an operation member of a normal push button type, a slide type, a dial type or the like, provided to the package portion of the camera body 10 of the camera 1, and is a structural section for operation collectively referring to various general operation members such as a shutter release button 15a (see FIG. 2, and the like). Also, in addition, the operation section 15 includes the touch panel 18b, and the like. Note that the touch panel 18b is arranged on the display surface of the display section 18, and is an operation member configured in such a way that various operation instruction signals are generated when a user performs a touch operation, a slide operation and the like on a predetermined region corresponding to a display screen of the display panel. An instruction input signal from the touch panel 18b is sent to the touch determination section 11c of the signal processing control section 11, and the operation input is determined.

The display section 18 is a structural section for performing image display under the control of the display control section 11e based on an image signal (image data) or the like outputted from the image pickup device 13, or an image signal (image data) or the like on which the extension process has been performed by the storage section 14.

The clock section 19 is an internal clock of a computer called a real-time clock (RTC). The clock section 19 is used at the time of attaching date information of a data file, or of time keeping or time control during control process, for example.

The temporary storage section 16 is a circuit section for temporarily storing image data acquired by the image pickup device 13 and the like, and a semiconductor memory device such as an EEPROM (electrically erasable programmable read-only memory), or a RAM (random access memory) is used, for example.

The accelerometer 17 is a detection circuit section for detecting the state of inclination, and attitudes such as vertical position and horizontal position of the camera 1.

The body-side communication section 12 is a circuit section for communication on the side of the camera body 10 for exchanging control signals, information signals and the like between the camera body 10 and the lens barrel 20 by being electrically connected with a lens-side communication section 22 described below.

The rotation determination section 30 is a determination circuit section for performing a rotation process of a display image so as to appropriately display the image with respect to the top-bottom relationship, based on attitude information of the camera 1 detected by the accelerometer 17 and the like.

The lens barrel 20 is configured mainly by a lens control section 21, the lens-side communication section 22, a lens-side operation section 23, a zoom drive section 24*a*, a focus drive section 24*b*, a zoom lens position detection section 25*a*, a focus lens position detection section 25*b*, a lens 26, which is an image pickup optical system, a lens-side storage section 27, and the like.

The lens control section 21 is a control section for controlling the operation of each structural unit on the side of the lens barrel 20 under the control of the signal processing control section 11 on the side of the camera body 10.

The operation section 23 collectively refers to operation members such as a focus ring for performing a switching operation at the lens side, such as switching between a normal image pickup mode and a close-up image pickup mode, operations such as an autofocus (AF) operation and a manual focus (MF) operation, and a focus adjustment operation, a zoom ring for performing a zoom operation, and the like.

The zoom drive section 24*a* is a drive unit for driving a zoom optical system, of the lens 26, related to a zoom operation. Also, the focus drive section 24*b* is a drive unit for driving a focusing optical system, of the lens 26, related to a focus operation.

The zoom lens position detection section 25*a* is a position detection circuit for detecting the position of the zoom optical system on the optical axis. Moreover, the focus lens position detection section 25*b* is a position detection circuit for detecting the position of the focusing optical system on the optical axis.

The lens-side storage section 27 is a circuit section including a storage medium in which various pieces of information regarding the lens barrel 20 and the like are stored in advance. The various pieces of information stored in the storage section 27 are used as appropriate and as necessary by being transferred to the side of the camera body 10 from the lens control section 21 via each of the communication sections 22 and 12. As this lens-side storage section 27, a non-volatile semiconductor memory device such as an EEPROM, a ROM (read only memory), or a flash memory is used, for example.

The lens 26 includes, in addition to an image pickup optical system, configured by a plurality of optical lenses or the like, for forming an optical image of an object, a plurality of lens barrel members for holding respective optical lenses of the image pickup optical system, driving lens barrels for separately moving each of the plurality of lens barrel members back and forth in the optical axis direction, and the like, a zoom control section 26*a* for controlling the zoom optical system which is a part of the image pickup optical system, a focus control section 26*b* for controlling the focusing optical system which is a part of the image pickup optical system, a diaphragm mechanism for adjusting the amount of a luminous flux passing through the image pickup optical system, a diaphragm control section 26*c* for driving the diaphragm mechanism, and the like. Note that, as described above, the image pickup section is configured by the lens 26 and the image pickup device 13 of the camera body 10.

The lens-side communication section 22 is a circuit section for communication on the side of the lens barrel 20 for exchanging control signals, information signals and the like between the lens barrel 20 and the camera body 10 by being electrically connected with the body-side communication section 12.

Note that the camera body 10 and the lens barrel 20 are configured by including other various structural units and the like in addition to the structural sections described above, but these various structural units and the like are structures not directly relevant to the present invention, and detailed description and illustration of the units are omitted assuming that the units have the same structures as those of a general, conventional camera.

For example, a shutter mechanism for opening/closing the optical path of the image pickup optical system, and adjusting the amount of luminous flux passing through the image pickup optical system at the time of an image pickup operation is not illustrated nor described, but the camera 1 of the present embodiment also includes a normal shutter mechanism similar to that of a conventional camera. This shutter mechanism may be a focal plane shutter arranged on the side of the camera body 10, or a lens shutter arranged on the side of the lens barrel 20. In the case the shutter mechanism is arranged on the side of the camera body 10, the shutter mechanism is controlled mainly by the control section on the body side. In the case the shutter mechanism is arranged on the side of the lens barrel 20, the shutter mechanism is controlled mainly through the lens control section 21 under the control of the control section on the body side.

The procedure for generating a photomontage by using image data acquired by performing image pickup using the camera 1 of the present embodiment configured in the above manner will be described below. FIGS. 2 to 5 are diagrams for describing the action at the time of generating a photomontage based on image data acquired by using the camera 1 of the present embodiment.

Note that, in the present invention, a photomontage refers to one image (photograph) generated based on a plurality of pieces of related picked-up image data, a plurality of pieces of picked-up image data with a story, or a plurality of pieces of picked-up image data combined based on the intention of a user.

FIG. 2 shows the state immediately after an image pickup operation by the camera 1 of the present embodiment, and shows a state where a so-called preview image which is an image acquired by the immediately preceding image pickup operation and which is reproduced/displayed on the display section 18 is displayed. At this time, an icon display 31 (in FIG. 2, an icon showing "continue photomontage") for inputting a generation instruction for a photomontage is displayed, being superimposed on the preview image on the display section 18, at a predetermined region. Preview image display is performed based on image data that is acquired by the immediately preceding image pickup operation and that is held in the temporary storage section 16. The preview image display is ended when a predetermined time of three seconds or five seconds, for example, has elapsed immediately after the image pickup operation, and then, display on the display section 18 is switched to a live view image.

Figure 3:
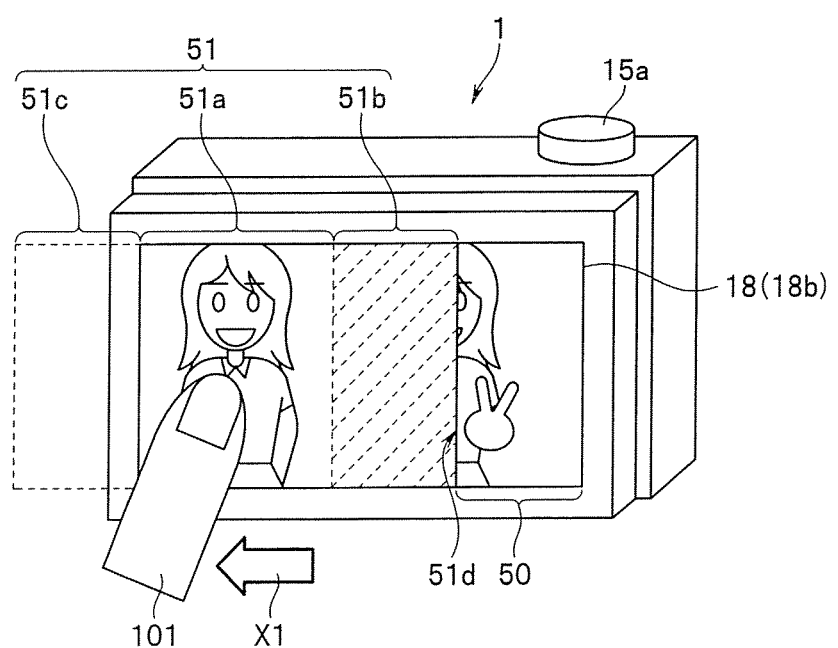
FIG. 3 is a diagram for describing an action at the time of generating a photomontage based on image data acquired by using the camera in FIG. 1, the diagram showing a state, following FIG. 2, where a photomontage arrangement in a photomontage generation mode is being set.

When, as shown in FIG. 2, a user performs a touch operation on a position corresponding to the icon 31 on the touch panel 18*b* using a finger 101 or the like, for example, at a time display as shown in FIG. 2 is performed, the camera 1 of the present embodiment switches to a photomontage generation mode. The user here performs a slide operation as shown in FIG. 3. In addition to the present embodiment, a function is provided according to which, when similar display as in FIG. 2 is shown and a touch operation is performed in a function mode for other than when a preview image is being displayed, such as an image reproduction mode for re-displaying a picked-up image, switching to the photomontage generation mode is performed.

FIG. 3 is a diagram for describing setting of a photomontage arrangement in the photomontage generation mode using the camera 1 of the present embodiment, and shows a procedure following the display state in FIG. 2. That is, a slide operation is performed on the touch panel 18*b* on the display section 18 in the state shown in FIG. 2 described above. For example, it is assumed that the finger 101 shown in FIG. 3 is slid in the direction of an arrow X1. Then, the display screen of the display section 18 changes to that in FIG. 3 based on the slide operation.

Figure 4:
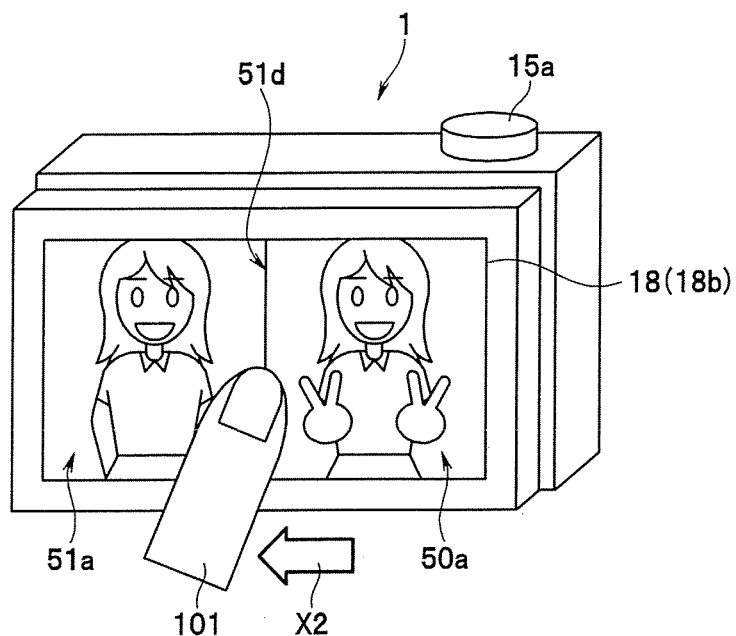
FIG. 4 is a diagram for describing an action at the time of generating a photomontage based on image data acquired by using the camera in FIG. 1, the diagram showing a state, following FIG. 3, where a photomontage arrangement in the photomontage generation mode is being set.

That is, the preview image (see the range indicated by a reference sign 51 in FIG. 3) which is displayed on the entire display screen of the display section 18 in FIG. 2 is slid, as shown in FIG. 3, in the direction of the arrow X1 according to the slide operation. Here, the region indicated by a reference sign 51c in FIG. 3 is a region which has moved out of the display screen of the display section 18 and where there is no display. Accordingly, when the slide operation described above is performed, regions, of the preview image 51, indicated by reference signs 51a and 51b are displayed on the display screen of the display section 18. Then, a part of the live view image at the time appears in a region 50 which newly shows up due to the sliding of the preview image 51. Next, it is assumed that the user performs a touch operation on a region including an edge 51d of the preview image 51 in FIG. 3, as shown in FIG. 4, and performs a slide operation in the direction of an arrow X2 in FIG. 4. Then, only the marginal region indicated by the reference sign 51b, of the preview image 51, gradually disappears according to the slide operation, and display as shown in FIG. 4 is obtained.

The operations on the touch panel 18b may be realized not only by the touch panel 18b, but also by assigning functions to other operation buttons and by using up-down, left-right operation buttons in combination.

FIG. 4 is a diagram for describing setting of a photomontage arrangement in the photomontage generation mode using the camera 1 of the present embodiment, and shows a procedure following the display state in FIG. 3. In the state shown in FIG. 4, the display in the region 51a, of the preview image 51, including a main object is left on the display section 18, and a partial region 50a of a live view display (50) is displayed in other region. Accordingly, by performing the next image pickup based on the live view image in the region 50a on the display section 18, the user may easily generate a photomontage by combining a part of the previous picked-up image data and a part of image data that is currently being picked up.

Figure 5:
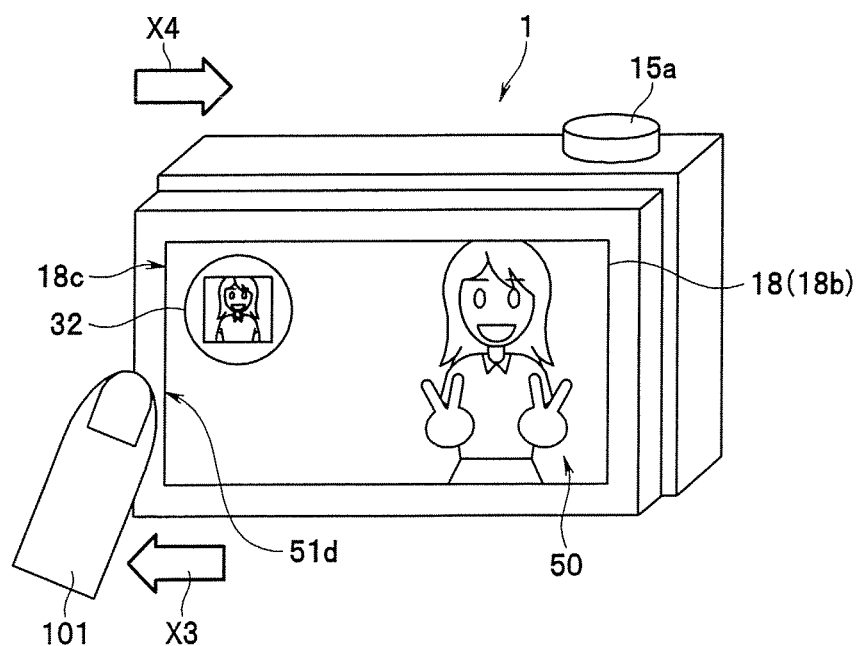
FIG. 5 is a diagram for describing an action at the time of generating a photomontage based on image data acquired by using the camera in FIG. 1, the diagram showing a state, following FIG. 4, where a photomontage arrangement in the photomontage generation mode is temporarily cancelled.

Also, the state as shown in FIG. 5 is obtained in the case the slide operation in the direction of the arrow X1 in the state shown in FIG. 3 or the slide operation in the direction of the arrow X2 in the state shown in FIG. 4 is continuously performed, and a flick operation on the preview image 51 in the direction of an arrow X3, to outside the screen is performed. FIG. 5 is a diagram for describing a state where a photomontage arrangement is temporarily cancelled in the photomontage generation mode using the camera 1 of the present embodiment, and shows a procedure following the display state in FIG. 3 or 4. That is, in FIG. 5, the live view image display 50 is displayed on the entire display region of the display section 18, and an icon display 32 indicating the effect that image data for photomontage is temporarily stored is displayed, being superimposed at a predetermined region in the live view image. In this state, the camera 1 is allowed to perform normal image pickup. Then, when, in this state, a touch operation on the icon 32 is performed, or an end portion 18c of the display section 18 is touched and a slide operation in the direction of an arrow X4 in FIG. 5 is performed, for example, the previous preview image data that is temporarily stored is called up, and an operation in the photomontage generation mode may be re-started.

Figure 6:
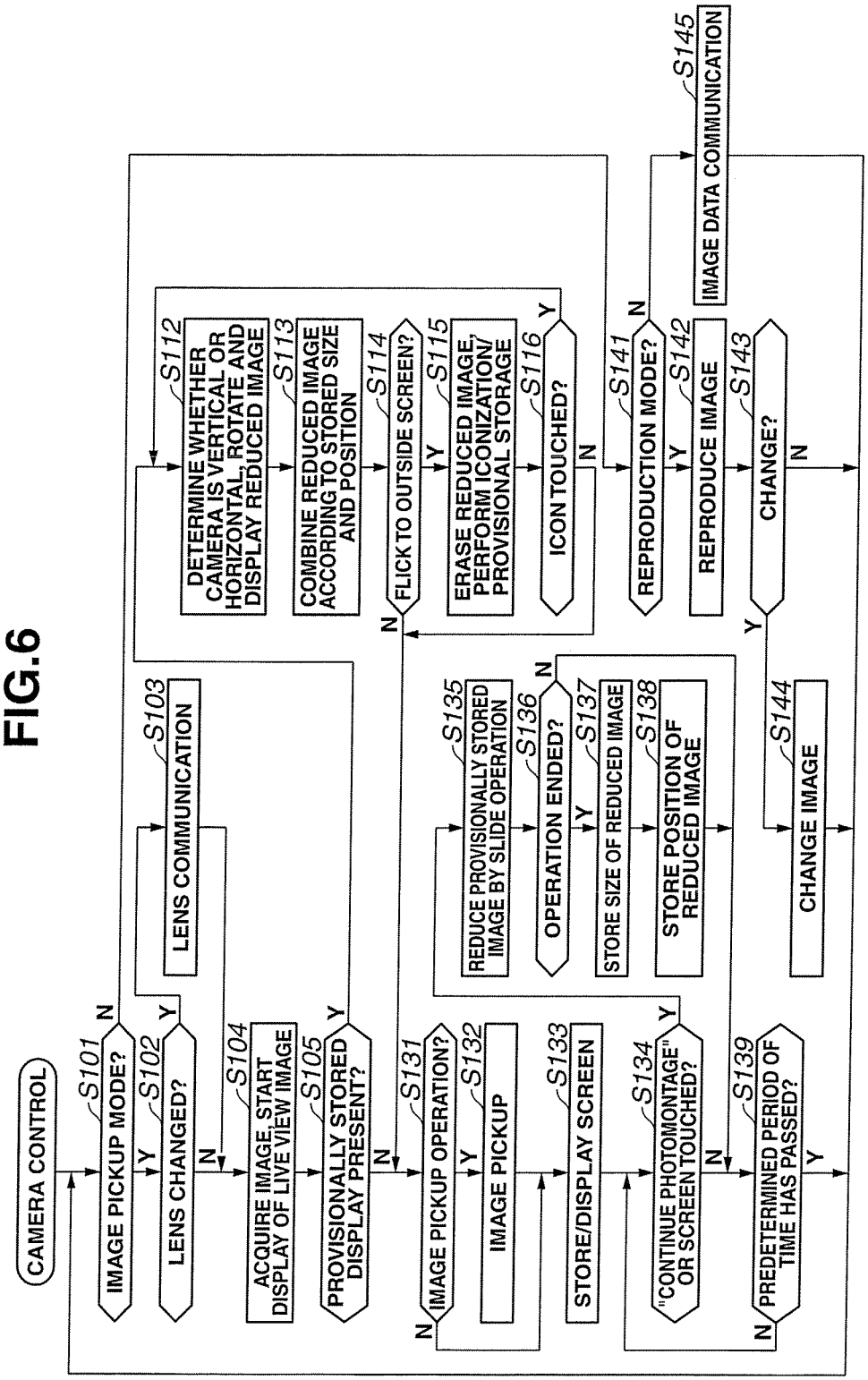
FIG. 6 is a flowchart showing a camera control process sequence for the camera in FIG. 1.

Next, a camera control process sequence for the camera 1 of the present embodiment will be described below with reference to the flowchart in FIG. 6.

First, it is assumed that the camera 1 is active and usable with the power being on. The process sequence in FIG. 6 is started in this state.

In step S101, the signal processing control section 11 checks whether or not the operation mode of the camera that is currently set is set to an image pickup operation mode. In the case it is confirmed here that the image pickup operation mode is set, the process proceeds to the next step S102. In the case other than the image pickup operation mode is set, the process proceeds to step S141.

In step S102, the signal processing control section 11 monitors a signal from the body-side communication section 12, and checks whether or not a lens change operation has been performed. In the case the lens change operation is confirmed here, the process proceeds to step S103. In the case no lens change operation is confirmed, the process proceeds to step S104.

In the case the lens change operation is confirmed, the signal processing control section 11 performs, in step S103, communication with the lens control section 21 of the newly attached lens barrel 20 through the communication sections 22 and 12, acquires unique information and the like of the lens barrel 20, and temporarily stores the information and the like in the temporary storage section 16, for example. Then, the process proceeds to step S104.

In step S104, the signal processing control section 11 controls the image pickup device 13 and acquires image data, and controls the display section 18 to perform a live view image display control process for the image based on the image data. At the same time, the lens barrel 20 is controlled, and focus control or the like is also performed. Then, the process proceeds to step S105.

In step S105, the signal processing control section 11 checks whether or not there is image data that is temporarily stored in the temporary storage section 16 (referred to as "provisionally stored data"), and whether or not an image based on this provisionally stored data is being displayed on the display section 18. In the case of the camera of the present embodiment, the provisionally stored data is assumed to be image data that is temporarily stored in the temporary storage section 16 as image data for photomontage generation. That is, according to this camera 1, a situation is possible where an operation for photomontage generation is already performed at a stage before the processing step above during use of the camera 1, image data is temporarily stored in the temporary storage section 16, and the operation for photomontage generation is interrupted. On the other hand, in the case the operation for photomontage generation is not performed in a stage before the processing step above, image data is not present in the temporary storage section 16. Checks regarding such various situations are performed in the process of step S105. That is, in the case image display based on the provisionally stored data is being performed, the process proceeds to step S112. In the case image display based on the provisionally stored data is not being performed, the process proceeds to step S131.

In the case image display based on the provisionally stored data is not being performed in step S105 described above and the process proceeds to step S131, the signal processing control section 11 monitors, in this step S131, an output signal from, for example, the shutter release button 15a of the operation section 15, and checks whether or not an image pickup operation by the user is performed. In the case an image pickup operation is confirmed here, the process proceeds to step S132. In the case an image pickup operation is not confirmed, the process proceeds to step S133.

In step S132, the signal processing control section 11 controls the image pickup device 13, the display section 18, the storage section 14, the lens barrel 20, and the like, and performs the normal image pickup operation. The image data acquired in this image pickup process is stored in the storage section 14. Then, the process proceeds to step S133.

In step S133, the signal processing control section 11 temporarily (provisionally) stores the image data acquired in the image pickup process in step S132 described above in the temporary storage section 16 (screen storage process), and also, performs a display process of controlling the display section 18 to display an image based on the image data.

As described above, immediately after an image pickup operation, an image based on the image data acquired by the image pickup operation is displayed on the display section 18 for a predetermined period of time. This display control action is called rec view display, and is an action that is generally performed by a conventional camera (image pickup apparatus). Note that the camera 1 of the present embodiment superimposes and displays, in a rec view display process performed at this time, the icon display 31 ("continue photomontage" icon) as shown in FIG. 2 on the provisionally stored image. Then, the process proceeds to step S134.

In step S134, the signal processing control section 11 monitors, through the touch determination section 11c, an operation input from the touch panel 18b, and checks whether or not a touch operation on a region corresponding to the icon display 31 or a touch operation on the screen is performed. In the case a predetermined touch operation is confirmed here, the process proceeds to step S135. In the case no predetermined touch operation is confirmed, the process proceeds to step S139.

In step S139, the signal processing control section 11 refers to the clock section 19, and checks whether or not a predetermined period of time has passed. The process of step S134 described above is repeated until a predetermined period of time has passed. Then, when passing of a predetermined period of time is confirmed, it is assumed that an operation related to photomontage generation was not performed, and the process goes back to step S101 described above.

The process proceeds to step S135 when a predetermined touch operation related to photomontage generation is confirmed in the process of step S134 described above. Here, the user is to perform a slide operation as shown in FIG. 3 following a predetermined touch operation (see FIG. 2) as described above.

When an instruction signal for the slide operation from the touch panel 18b is confirmed, the signal processing control section 11 performs, in step S135, a reduction process for the provisionally stored image. This provisionally stored image reduction process is a process related to the action described with reference to FIG. 3.

Subsequently, in step S136, the signal processing control section 11 checks whether or not the slide operation described above has ended. In the case end of the slide operation is confirmed here, the process proceeds to step S137. In the case end of the slide operation is not confirmed, the process proceeds to step S139.

Next, in step S137, the signal processing control section 11 performs a process of storing information (data) regarding the size of a reduced image set by the slide operation described above in the temporary storage section 16. Then, the process proceeds to step S138.

In step S138, the signal processing control section 11 performs a process of storing information (data) regarding the position of the reduced image set by the slide operation described above in the temporary storage section 16. Then, the process proceeds to step S139. Data related to the provisionally stored image is thus temporarily stored in the temporary storage section 16.

On the other hand, in the case image display based on the provisionally stored data is being performed in step S105 described above and the process proceeds to step S112, the signal processing control section 11 monitors, in this step S112, a signal from the accelerometer 17, checks the attitude of the camera 1, and determines whether the attitude is a vertical position attitude or a horizontal position attitude. At the same time, display setting of the reduced image is changed according to the attitude of the camera 1. That is, the reduced image is rotated according to the change in the attitude of the camera 1 to achieve appropriate display.

The size, the position, and the like of the reduced image at this time are set by referring to the information (data), regarding the reduced image stored in the temporary storage section 16. Accordingly, in step S113 in FIG. 6, the signal processing control section 11 performs a combined display process of superimposing, and displaying the reduced image on the live view image based on the size and position information. Then, the process proceeds to step S114.

Figure 7:
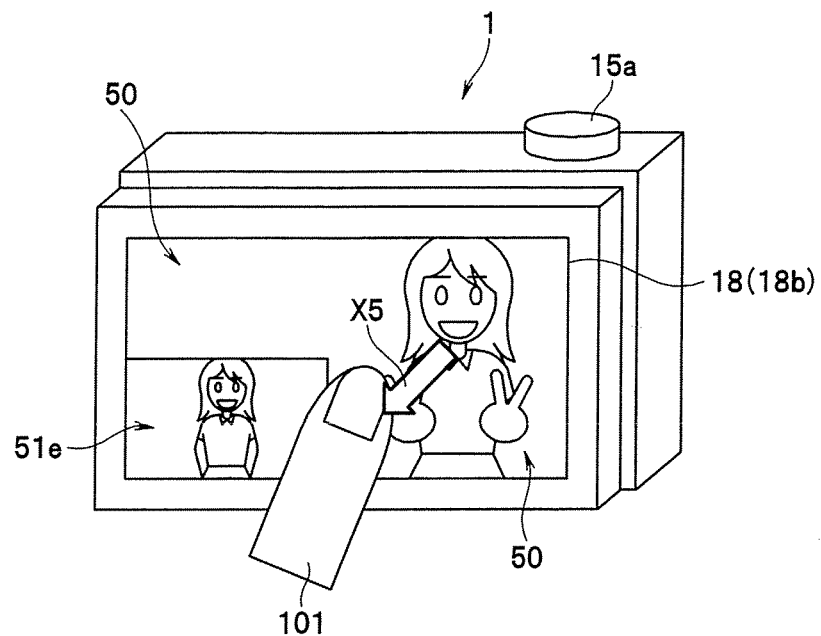
FIG. 7 is a diagram showing setting of a photomontage arrangement in the photomontage generation mode, based on image data acquired by using the camera in FIG. 1.

Here, an example of a case where the attitude of the camera 1 is a horizontal position attitude is shown in FIG. 7, for example. Like FIG. 4, FIG. 7 is a diagram showing setting of a photomontage arrangement in the photomontage generation mode using the camera 1 of the present embodiment.

In the state shown in FIG. 7, a reduction operation on the preview image 51 is performed in the state where the attitude of the camera 1 is a horizontal position attitude, by the user performing a slide operation in the direction of an arrow X5 on the preview image 51 by the finger 101. The preview image 51 is displayed in a reduced manner by this slide operation, as shown by a reference sign 51e in FIG. 7. At this time, the live view display 50 is displayed in the region other than the display of the reduced image 51e, as the display on the display section 18.

Figure 8:
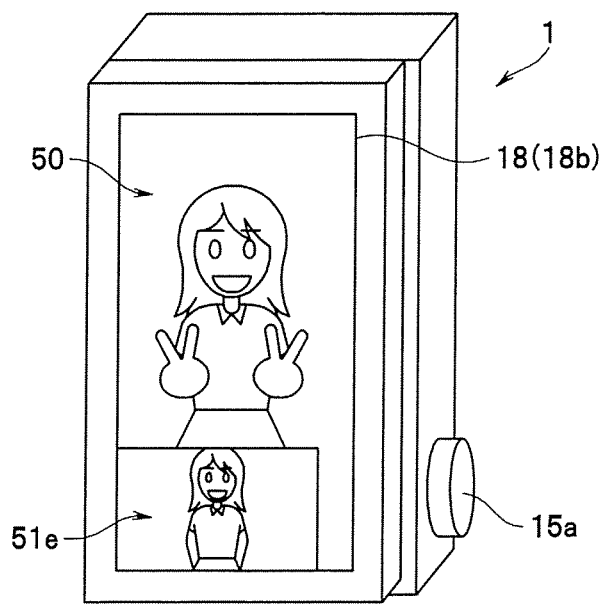
FIG. 8 is a diagram showing a state where the attitude of the camera is changed to a vertical position attitude from the state in FIG. 7.

It is assumed that the attitude of the camera 1 is changed to a vertical position attitude as shown in FIG. 8 when the display on the display section 18 of the camera 1 is in the state shown in FIG. 7, for example. Then, in the display on the display section 18, the live view image 50 is switched to vertical position display, as shown in FIG. 8, according to the change in the attitude of the camera 1, and also, as described with reference to the process of step S112 in FIG. 6 described above, the reduced image 51e is rotated 90 degrees from the state in FIG. 7 and changed to the display state shown in FIG. 8. In this state, the display position of the reduced image 51e is set based on the position information in the related information.

That is, this example shows a case of a setting where the reduced image 51e at the time the camera 1 is at the horizontal position attitude in FIG. 7 is displayed near the bottom left corner on the display screen of the display section 18.

The horizontal position attitude in FIG. 7 is changed to the vertical position attitude in FIG. 8 in this state. In this case, as the vertical position attitude, there may be assumed a vertical position attitude with the shutter release button 15a on the lower side, and a vertical position attitude with the shutter release button 15a on the upper side. The example shown in FIG. 8 shows a case where the attitude has been changed to the vertical position attitude with the shutter release button 15a on the lower side. At this time, in the present example display, the reduced image 51e is set such that it is rotated 90 degrees anti-clockwise from the state in FIG. 7 and is displayed at a position near the bottom left corner on the display screen of the display section 18 which is positioned vertically, as shown in FIG. 8. Although not shown, in the case where the attitude is changed from the horizontal position attitude shown in FIG. 7 to the vertical position attitude with the shutter release button 15a on the upper side, for example, the reduced image 51e is set such that it is displayed near the bottom left corner of the display screen of the display section 18 in the same manner as in FIG. 8. Note that, in this case, the reduced image 51e is rotated 90 degrees clockwise from the state in FIG. 7.

That is, when the attitude of the camera 1 is changed, the display position of the reduced image 51e is set based on the position information in the related information, and the size of the reduced image 51e is also set based on the corresponding information. Then, the reduced image 51e is displayed after being rotated by predetermined angles and in a predetermined direction according to the change in the attitude of the camera 1, such that the display state of the reduced image 51e is always maintained appropriate with respect to the top-bottom direction.

Referring back to FIG. 6, in step S114, the signal processing control section 11 monitors, through the touch determination section 11c, an operation input from the touch panel 18b, and checks whether or not a flick operation to outside the screen is performed. Here, in the case a flick operation to outside the screen is confirmed, the process proceeds to step S115. In the case a flick operation to outside the screen is not confirmed, the process proceeds to step S131.

When a flick operation to outside the screen is confirmed in the process of step S114 described above, and the process proceeds to step S115, the signal processing control section 11 controls, in this step 115, the display section 18 and the like through the display control section 11e, erases the display of the reduced image 51e (see FIGS. 7 and 8) that is being displayed, and controls the image pickup device 13, the display section 18, the lens barrel 20, and the like to display the live view display 50 on the entire screen, and also, displays an icon 32 as shown in FIG. 5 (iconization of the reduced image). At the same time, the data of the reduced image that was displayed until immediately before the process of step S115 and information (data) regarding the same are provisionally stored in the temporary storage section 16. Then, the process proceeds to step S116.

Subsequently, in step S116, the signal processing control section 11 monitors, through the touch determination section 11c, an operation input from the touch panel 18b, and checks whether or not a touch operation is performed on the icon 32. Here, in the case a touch operation on the icon 32 is confirmed, the process goes back to step S112. In the case a touch operation on the icon 32 is not confirmed, the process goes back to the process of step S131 described above.

On the other hand, in the case setting of other than the image pickup operation mode is confirmed in the process of step S101 described above and the process proceeds to step S141, the signal processing control section 11 checks, in this step S141, whether or not the operation mode of the camera 1 is set to the reproduction mode. In the case it is confirmed here that the reproduction mode is set, the process proceeds to the next step S142. In the case other than the reproduction mode is set, the process proceeds to step S145.

In step S142, the signal processing control section 11 controls the storage section 14, the display section 18, and the like, and performs an image reproduction process. By performing icon display during image reproduction and performing the processes from step S134 to step S138, transition to a photomontage mode may be made.

Then, the process proceeds to step S143.

Next, in step S143, the signal processing control section 11 monitors an instruction signal from the operation section 15, and checks for a reproduction image change instruction signal instructing change of an image being displayed. In the case a reproduction image change instruction signal is confirmed here, the process proceeds to the next step S144, and the signal processing control section 11 controls, in the process of this step S144, the storage section 14, the display section 18, and the like, and performs a reproduction image change process. Then, the process goes back to step S101 described above.

On the other hand, in the case the reproduction image change instruction signal is not confirmed in the process of step S143 for a predetermined period of time, the process goes back to the process of step S101 after the predetermined period of time has passed.

In the case setting of other than the reproduction mode is confirmed in the process of step S144 and the process proceeds to step S145, the signal processing control section 11 determines, in this step S145, that the operation mode of the camera 1 is set to an image communication mode, for example, and performs a communication image file acquisition process. Then, the process goes back to step S101.

Note that, in the process of step S145 described above, a description is given citing an image communication mode as an example of the operation mode other than the image pickup operation mode and the reproduction mode, but this is not restrictive. For example, a menu mode for allowing various settings at the camera 1, or the like is also possible. However, such operation modes other than the image pickup operation are not directly relevant to the present invention, and a detailed description thereof is omitted.

As described above, according to the embodiment described above, at the time of acquiring image data while continuing normal photograph image pickup, or during image reproduction, an icon for allowing activation of an operation mode for photomontage generation is displayed, being superimposed on the rec view display or the reproduction image, and thus, when desired image data is acquired, the simple operation state of rec view display may be switched seamlessly to the operation mode for photomontage generation simply by a touch operation or the like on the icon display.

When switching to the photomontage generation mode is performed in the above manner during execution of the image pickup operation mode, a process such as image reduction for photomontage generation may be performed simply by an intuitive touch & slide operation on the touch panel 18b corresponding to the display section 18. The user may enjoy performing an operation of dividing and arranging a plurality of pieces of acquired image data on the display screen according to his/her taste every time he/she has performed the image pickup operation, and may thereby easily generate one photomontage.

Also, seamless transition to the operation mode allowing the photomontage generation operation is enabled every time desired image data is acquired while the normal image pickup operation is under way, and the user is not made conscious of the switching of the operation modes and is not bothered by complicated operations, and the operability is increased. On the other hand, in the case there is a demand for acquisition of new image data during the photomontage generation operation because the acquired image data is not fit and the image data is rejected, or in the case image pickup unrelated to the photomontage being generated is desired to be performed, the photomontage generation operation under way may be easily cancelled simply by a flick operation, and the next image pickup operation may be easily performed, and thus, the user may continue the image pickup operation without being conscious of the operation mode. Furthermore, also in this case, the icon display for activating the operation mode for photomontage generation is performed in the rec view display that is displayed after the next image pickup operation, and thus, the user may seamlessly and easily go back to the photomontage generation operation mode.

Figure 9:
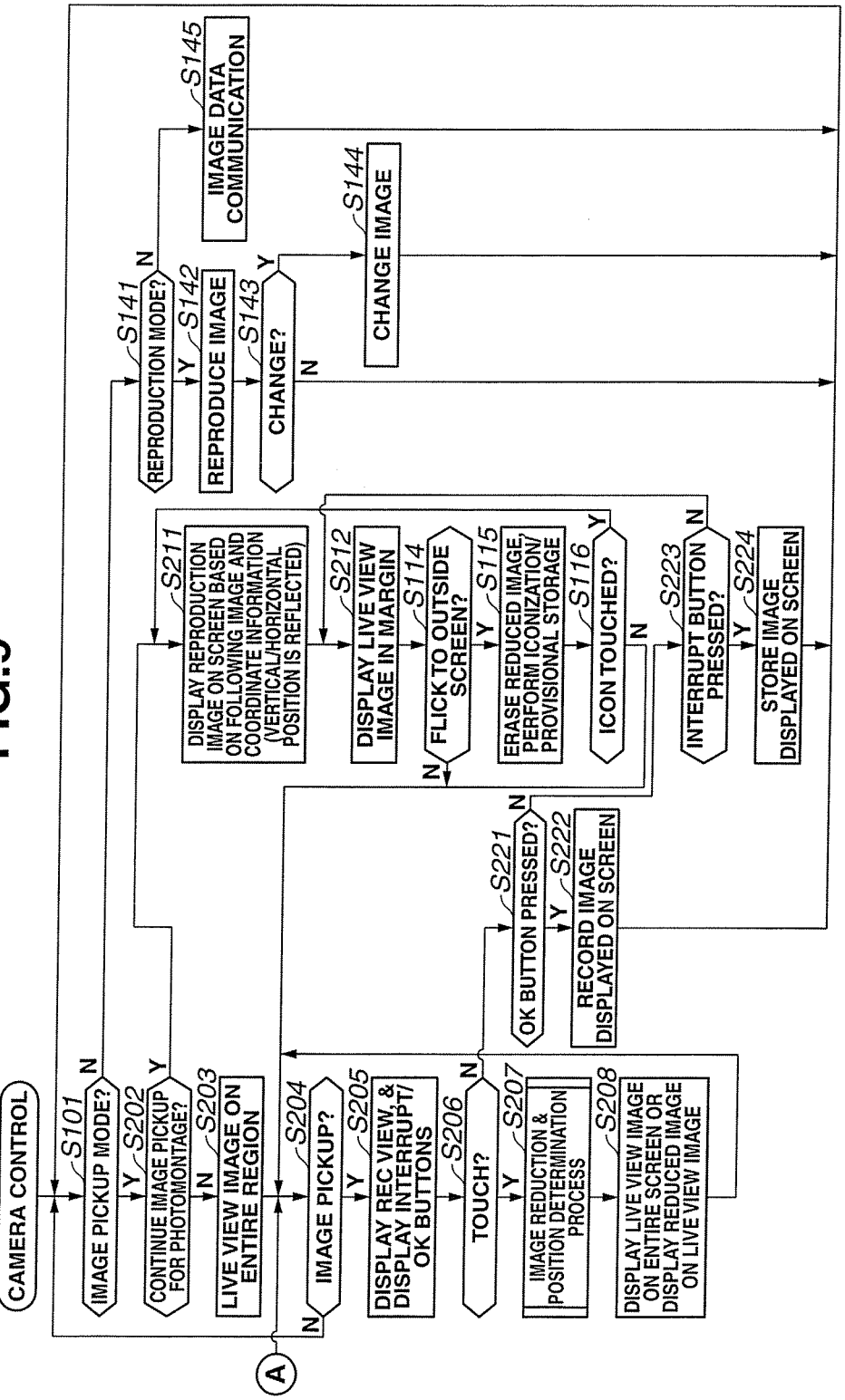
FIG. 9 is a flowchart showing a modification of the camera control process sequence of the image pickup apparatus according to an embodiment of the present invention.
Figure 10:
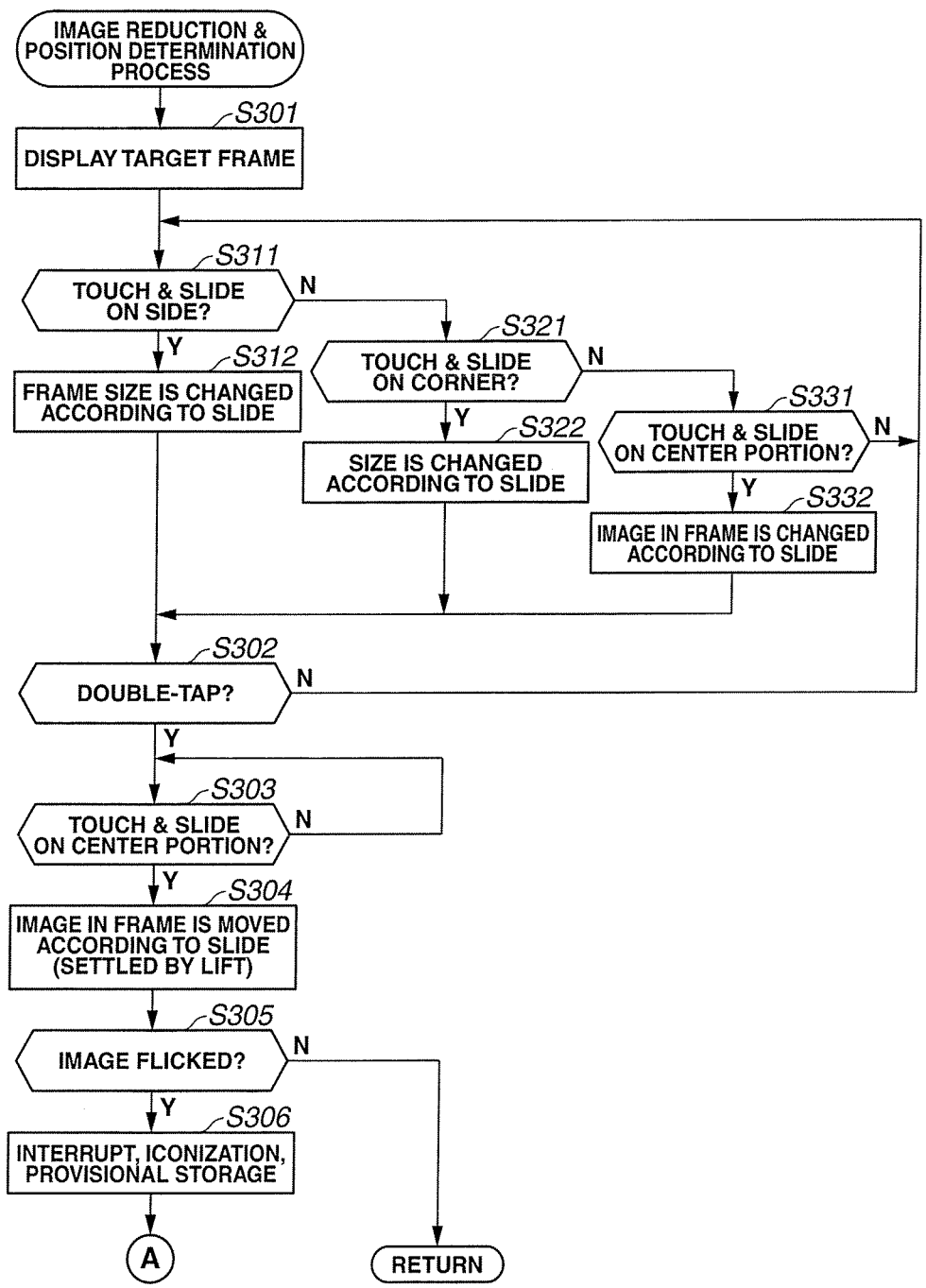
FIG. 10 is a flowchart showing a process sequence for an image reduction & position determination process (step S207 in FIG. 9) in the sequence in FIG. 9.

Next, a modification of the camera control process of the image pickup apparatus of the present embodiment will be described below with reference to FIGS. 9 and 10. FIG. 9 is a flowchart showing a camera control process sequence of the present modification. FIG. 10 is a flowchart showing a process sequence for an image reduction & position determination process (step S207 in FIG. 9) in the sequence in FIG. 9.

Note that the basic configuration of the image pickup apparatus of the present modification is exactly the same as that of the embodiment described above. Accordingly, in the following description, the block configuration diagram in FIG. 1 described in the embodiment described above is referred to, and each structural component is described in the following description using the same reference sign.

Furthermore, some of the processing steps of the camera control process sequence of the image pickup apparatus according to the present modification are substantially the same as those of the embodiment described above. Accordingly, the same processing steps are denoted by the same step numbers and description thereof is omitted, and only the different processing steps are described below in detail.

First, the process sequence in FIG. 9 is started when the camera 1 is active and usable with the power being on. In FIG. 9, the process of step S101 is a step of checking the image pickup operation mode (same as in FIG. 6).

Here, in the case it is confirmed that the image pickup operation mode is set, the process proceeds to the next step S202. In the case other than the image pickup operation mode is set, the process proceeds to step S141.

Note that in the case it is confirmed here that other than the image pickup operation mode is set, and the process proceeds to step S141, each of the following processing steps S142, S143, S144, and S145 are the same as those of the embodiment described above (same as in FIG. 6).

On the other hand, in the case it is confirmed in the process of step S101 that the image pickup operation mode is set, and the process proceeds to step S202, the signal processing control section 11 monitors, through the touch determination section 11c, an output signal from the touch panel 18b in this step S202, and checks whether or not there is a touch input for the icon display 31, as shown in FIG. 2, indicating "continue photomontage" or the like. In this case, nothing is displayed on the display section 18 yet immediately after the activation, and the icon display 31 is, of course, not displayed. Accordingly, there is no touch input for the icon display 31. Furthermore, during the image pickup operation sometime after the activation, a picked-up image is displayed on the display section 18, and the icon display 31 is displayed being superimposed on the image. In the case a touch input for the icon display 31 is confirmed here, the process proceeds to step S211. In the case a touch input for the icon display 31 is not confirmed (for example, a state immediately after the activation), the process proceeds to step S203.

In step S203, the signal processing control section 11 controls the image pickup device 13 and acquires image data, and controls the display section 18 to perform a live view image display control process for the image based on the image data. At the same time, the lens barrel 20 is controlled, and focus control or the like is also performed. Then, the process proceeds to step S204.

In step S204, the signal processing control section 11 monitors an output signal from, for example, the shutter release button 15a of the operation section 15, and checks whether or not an image pickup operation by the user is performed. In the case an image pickup operation is confirmed here, the signal processing control section 11 controls the image pickup device 13, the display section 18, the storage section 14, the lens barrel 20, and the like, and performs the normal image pickup operation. The image data acquired in this image pickup process is stored in the storage section 14. Then, the process proceeds to step S205. In the case an image pickup operation is not confirmed, the process goes back to step S101.

In step S205, the signal processing control section 11 controls the display section 18 and the like through the display control section 11e, and performs so-called rec view display of displaying an image based on the image data acquired by the image pickup operation described above. At the same time, the signal processing control section 11 controls the display section 18 and the like through the display control section 11e, and superimposes and displays an "interrupt" button (icon) and an "OK" button (icon) at predetermined positions in the display screen. The "interrupt" button and the "OK" button here are icon displays for instructing whether or not the image that is currently displayed as the rec view display on the display section 18 is to be used as a part of the photomontage to be generated.

Subsequently, in step S206, the signal processing control section 11 monitors, through the touch determination section 11c, an operation input from the touch panel 18b, and checks whether or not a touch operation on the icon display indicating "interrupt" or "OK", or a touch operation on a rec view image that is being displayed, or the like is performed. Here, in the case a touch operation on the "interrupt" or "OK" icon is confirmed, the process proceeds to step S221. In the case a touch operation on the rec view image, or the like is performed, the process proceeds to step S207.

In step S207, the signal processing control section 11 performs an image reduction process and a position determination process according to the touch operation. The detailed sequence of the image reduction process and the position determination process is shown in FIG. 10.

Here, the details of process sequence of the image reduction process and the position determination process in FIG. 10 are given below.

First, the state before this process sequence is started is a state where a rec view image is displayed on the display section 18 (the state described with reference to step S205 in FIG. 9).

Now, in step S301 in FIG. 10, the signal processing control section 11 controls the display section 18 through the display control section 11 e, and displays a target frame, for example, a rectangular frame, on the display screen of the display section 18. This target frame is initially set to a frame size including the entire display region of the display section 18. Also, a rec view image, that is, an image based on image data that is acquired by the immediately preceding image pickup operation and that is temporarily stored, is displayed in this target frame.

In this state, the user may change (reduce) the size of the target frame by performing a touch & slide operation near one of the four sides, or near the desired one of four corners, of the displayed target frame. Also, by performing a touch & slide operation on near the center portion of the frame, the display region of the image in the target frame may be changed. By performing these operations, the size of the rec view image (temporarily stored image) may be changed (reduced), or the state of the image in the frame may be changed.

That is, in step S311, the signal processing control section 11 monitors, through the touch determination section 11c, an operation input from the touch panel 18b, and checks whether or not a touch & slide operation is performed on one side of the frame. In the case a touch & slide operation on one side of the frame is confirmed here, the process proceeds to step S312. In the case the touch & slide operation that is performed is not for the side of the frame, the process proceeds to step S321.

In step S312, the signal processing control section 11 controls the display section 18 through the display control section 11e, and causes the frame size to change according to the slide operation. Then, when a lift operation of separating the finger from the touch panel 18b after the touch & slide operation is performed, the result of the immediately preceding touch & slide operation is temporarily fixed. Then, the process proceeds to step S302.

In step S302, the signal processing control section 11 monitors, through the touch determination section 11c, an operation input from the touch panel 18b, and checks whether or not a double-tap operation is performed. A double-tap operation here is an operation of successively performing two tap operations. Note that a tap operation is an operation of swiftly performing a touch operation (operation of coming into contact) and a lift operation (operation of separation). The double-tap operation in this case is an operation for fixing the immediately preceding touch & slide operation. That is, in the case the double-tap operation is confirmed here, the process proceeds to step S303. In the case the double-tap operation is not confirmed, the process goes back to step S211 described above, and a state of monitoring an operation input from the touch panel 18b is reached.

In the case a touch & slide operation on a side of the frame is not confirmed in the process of step S311 described above, and the process proceeds to step S321, the signal processing control section 11 monitors, through the touch determination section 11c, an operation input from the touch panel 18b in this step S321, and checks whether or not a touch & slide operation on one corner of the frame is performed. In the case a touch & slide operation on one corner of the frame is confirmed here, the process proceeds to step S322. In the case the touch & slide operation that is performed is not for the corner of the frame, the process proceeds to step S331.

In step S322, the signal processing control section 11 controls the display section 18 through the display control section 11e, and changes the frame size according to the slide operation described above. Then, when a lift operation of separating the finger from the touch panel 18b is performed after the touch & slide operation, the result of the immediately preceding touch & slide operation is temporarily fixed. Then, the process proceeds to step S302.

In the case a touch & slide operation on the corner of the frame is not confirmed in the process of step S321 described above, and the process proceeds to step S331, the signal processing control section 11 monitors, through the touch determination section 11c, an operation input from the touch panel 18b in this step S331, and checks whether or not a touch & slide operation on near the center portion of the frame is performed. In the case a touch & slide operation on near the center portion of the frame is confirmed here, the process proceeds to step S332. In the case the touch & slide operation that is performed is not for near the center portion of the frame, the process goes back to step S311.

In step S332, the signal processing control section 11 controls the display section 18 through the display control section 11e, and moves the image in the frame according to the slide operation. The range of an image to be displayed in the target frame may be set by this operation. That is, the size of the target frame is smaller than the entire image range of a rec view image (temporarily stored image). Thus, the range of an image that may be displayed in the target frame is obtained by cutting out (trimming) a part of the original entire image range of the rec view image (temporarily stored image). The touch & slide operation that is performed in this step S332 is an operation of cutting out a desired display range. Then, when a lift operation of separating the finger from the touch panel 18b is performed after the touch & slide operation, the result of the immediately preceding touch & slide operation is temporarily fixed. Then, the process proceeds to step S302.

In this manner, the user changes the frame size or performs setting related to the image in the frame by performing a touch & slide operation several times on the target frame display. Then, when the double-tap operation in the process of step S302 is confirmed, the size of the target frame and the display in the frame are fixed.

When the size of the reduced image and the image in the frame are thus fixed, next, in step S303, the signal processing control section 11 again monitors, through the touch determination section 11c, an operation input from the touch panel 18b, and checks whether or not a touch & slide operation on near the center portion of the frame is performed. Here, confirmation of a touch & slide operation on near the center portion of the frame is waited for, and when the operation is confirmed, the process proceeds to step S304.

In step S304, the signal processing control section 11 controls the display section 18 through the display control section 11e, and moves the frame position according to the slide operation. That is, the arrangement of the target frame (reduced image) in the display screen of the display section 18 is set by this touch & slide operation. Then, when a lift operation is performed, the position of the target frame in the display screen of the display section 18 is decided. Then, the process proceeds to step S305.

In step S305, the signal processing control section 11 monitors, through the touch determination section 11c, an operation input from the touch panel 18b, and checks whether or not a flick operation to outside the screen is performed. In the case a flick operation to outside the screen is confirmed here, the process proceeds to step S306. In the case a flick operation to outside the screen is not confined, the process goes back (returns) to the original process in FIG. 9, and proceeds to step S208 in FIG. 9.

In step S306, the signal processing control section 11 controls the display section 18 and the like through the display control section 11e, erases the reduced image that is being displayed, and controls the image pickup device 13, the display section 18, the lens barrel 20, and the like to display the live view display on the entire screen, and also, superimposes and displays an icon 32 as shown in FIG. 5 (iconization of the reduced image), for example. At the same time, the data of the reduced image that was displayed immediately before and information (data) regarding the same are provisionally stored in the temporary storage section 16. Then, the process goes back to the process of step S204 in FIG. 9 (see a reference sign A in FIGS. 9 and 10).

Referring back to FIG. 9, in step S208, the signal processing control section 11 controls the image pickup device 13, the display section 18, the lens barrel 20, and the like to display the live view image. In this case, the live view image is displayed on the entire screen, or the reduced image is superimposed and displayed on the live view image. Then, the process goes back to step S204.

On the other hand, in the case a touch operation on the "interrupt" or "OK" icon display is confirmed in the process of step S206 described above, and the process proceeds to step S221, the signal processing control section 11 checks, in this step S221, whether or not the touch operation in the process of step S206 described above is for the "OK" button (icon), that is, whether or not the "OK" button is pressed (touch operation is performed thereon). Here, in the case a touch operation on the "OK" button is confirmed, the process proceeds to step S222. In the case the touch operation which has been confirmed is not for the "OK" button, the process proceeds to step S223.

In step S222, the signal processing control section 11 controls the image pickup device 13, the display section 18, the storage section 14, the temporary storage section 16, and the like, and performs a storage process for the image data of the image that is being displayed on the display screen of the display section 18, that is, the photomontage image having the reduced image displayed, at a desired position and with a desired size, on the live view image. Then, the process goes back to step S101.

On the other hand, in step S223, the signal processing control section 11 checks whether or not the touch operation in the process of step S206 described above is for the "interrupt" button (icon), that is, whether or not the "interrupt" button is pressed (touch operation is performed thereon). In the case a touch operation on the "interrupt" button is confirmed here, the process proceeds to step S224. In the case the confirmed touch operation is not for the "interrupt" button, the process goes back to step S212.

In step S224, the signal processing control section 11 controls the image pickup device 13, the display section 18, the temporary storage section 16, and the like, and performs a temporary storage process for the image data of the image that is being displayed on the display screen of the display section 18, that is, the photomontage image having the reduced image displayed, at a desired position and with a desired size, on the live view image. Then, the process goes back to step S101.

On the other hand, if a touch input on the icon display 31 is confirmed in the process of step S202 as described above, the process proceeds to step S211. In the process of this step S211, the signal processing control section 11 displays, on the display screen of the display section 18, the live view image, and a reduced image of a temporarily stored image which was picked up and acquired immediately before the live view image (referred to as a "following image" in S211 in FIG. 9), the reduced image being superimposed at a desired position and with a desired size (see coordinate information or the like). In this case, display according to the attitude of the camera 1 is shown. That is, the signal processing control section 11 monitors a signal from the accelerometer 17 and checks the attitude of the camera 1 to achieve, according to a change in the attitude of the camera 1 which has been confirmed, appropriate display of the reduced image with respect to the position in the display region and the up-down direction. Note that the process of step S211 is substantially the same as that of step S112 shown in FIG. 6 described above.

Then, in step S212, the signal processing control section 11 controls the image pickup device 13, the display section 18, and the like, and performs a process of displaying the live view image in the marginal region, of the display region of the display section 18, which is a region other than the region for displaying the reduced image. Then, the process proceeds to step S114.

Note that each processing step of S114, S115, and S116 is the same as the process of the same corresponding step number described with reference to FIG. 6 of the embodiment described above.

Also according to the modification described above, the same effect may be easily achieved as the embodiment described above.

The procedure of each processing sequence described in the embodiment described above may be changed as long as the change does not contradict the nature of the sequence. Accordingly, with the processing sequences described above, the execution order of each of the processing steps may be changed, or a plurality of processing steps may be performed simultaneously, or the order of each of the processing steps may be different each time a series of processing sequence is performed.

Note that the present invention is not limited to the embodiment described above, and various modifications and applications may of course be realized within the scope of the invention. Furthermore, the embodiment described above includes inventions at various stages, and various inventions may be extracted by appropriately combining a plurality of disclosed structural elements. For example, in the case where, even if some of the structural elements are omitted from all the structural elements indicated in the embodiment described above, the issues to be solved by the invention may be solved, and the effects of the invention may be achieved, the configuration from which the structural elements are omitted may be extracted as the invention.

The present invention is not restricted to the image pickup apparatus, which is an electronic apparatus specialized in the image pickup function such as a digital camera, but may be widely applied to electronic apparatuses of other modes including the image pickup function, such as various types of electronic apparatuses with the image pickup function including a mobile phone, an audio recording apparatus, an electronic diary, a personal computer, a game console, a TV, a clock, a navigation device using GPS (global positioning system), and the like.

What is claimed is:

1. An image pickup apparatus comprising:
    an image pickup section configured by an image pickup optical system for forming an optical image, and an image pickup device for photoelectrically converting the optical image formed by the image pickup optical system and generating first image data;
    a storage section for temporarily storing the first image data picked up by the image pickup section or second image data picked up in a past;
    a display section for displaying an image based on the first image data or the second image data stored in the storage section;
    an operation section for making a division instruction that a region to be displayed on the display section is to be divided, and a flick instruction for making an instruction for providing a reduced image of image data displayed on the display section;
    an attitude detection section for detecting in which one of an attitude of a vertical position and a horizontal position the image pickup section performs photographing; and
    a signal processing control section including at least a display control section for driving the display section, and an image processing section for performing image signal processing on the first image data or the second image data,
    wherein the signal processing control section, in accordance with a result detected by the attitude detection section, performs display control of displaying, on the display section, an image based on the second image data that is temporarily stored in the storage section, and if the signal processing control section receives the division instruction from the dividing operation section, dividing a display region of the display section, causing second image data to be displayed in one of regions obtained by the division, and repeatedly updating/displaying first image data acquired by the image pickup section in a display region, of the display section, different from a display region of the second image, while when the signal processing control section receives the flick instruction from the operation section, causing the display section to display the first image data, and displaying in a superimposed manner a reduced image of the second image data at a display position set in advance.

2. The image pickup apparatus according to claim 1, wherein the operation section instructs that the region displayed on the display section is to be divided into regions of different sizes.

3. The image pickup apparatus according to claim 1, wherein at a time of displaying the second image in a region obtained by the division, the signal processing control section reduces the image according to the display region.

4. The image pickup apparatus according to claim 1, wherein at a time of displaying the first image in a region obtained by the division, the signal processing control section reduces the image according to the display region.

5. The image pickup apparatus according to claim 1, wherein at a time of displaying the first image in a region obtained by the division, the signal processing control section cuts out the image according to the display region.

6. The image pickup apparatus according to claim 1, wherein at a time of dividing the display region of the display section after receiving an instruction operation on the operation section, the signal processing control section displays, on the display section, an indicator indicating a dividing position, and performs a division based on the indicator.

7. An image pickup apparatus comprising:
an image pickup section configured by an image pickup optical system for forming an optical image, and an image pickup device for photoelectrically converting the optical image formed by the image pickup optical system and generating image data;
a display section for displaying an image based on the image data acquired by the image pickup section;
an operation section arranged near the display section;
an attitude detection section for detecting in which one of an attitude of a vertical position and a horizontal position the image pickup section performs photographing;
a temporary storage section for temporarily storing the image data acquired by the image pickup section; and
a signal processing control section including at least a display control section for driving the display section, and an image processing section for performing image signal processing on the image data acquired by the image pickup section,
wherein the signal processing control section, in accordance with a result detected by the attitude detection section, performs display control of displaying, on the display section, an image based on the image data that is temporarily stored in the temporary storage section, and if the signal processing control section receives a first predetermined operation on the operation section, performing a reduction process on the image that is displayed on the display section, displaying, on the display section, a reduced image reflecting a result of the reduction process, and successively updating/displaying an image that is acquired by the image pickup section in a marginal portion, other than a display region of the reduced image, on the display section, while if the signal processing control section receives a second predetermined operation from the operation section, causing the display section to display the first image data, and displaying in a superimposed manner a reduced image of the second image data at a display position set in advance.

8. The image pickup apparatus according to claim 7, wherein the operation section is a touch panel arranged on a display surface.

9. The image pickup apparatus according to claim 8, wherein the first predetermined operation is a touch/slide operation on the touch panel, and the second predetermined operation is a flick operation.

10. The image pickup apparatus according to claim 7, wherein the display control section, while displaying an image based on image data that is successively outputted from the image pickup section on an entire display region of the display section, updates only an image in a region corresponding to the marginal portion.

11. The image pickup apparatus according to claim 7,
wherein the signal processing control section further includes an image combining section, and
wherein the image combining section generates one piece of image data by combining an image based on image data that is successively outputted from the image pickup section and an image based on reduced image data representing the reduced image.

12. The image pickup apparatus according to claim 7, wherein the display control section displays an icon indicating an operation mode allowing a photomontage generation operation, by superimposing the icon on a rec view display after an image pickup operation.

13. The image pickup apparatus according to claim 7, wherein the display control section cancels a reduction operation under way, after receiving a flick operation, on the touch panel, at a region corresponding to the reduced image.

14. An image pickup method comprising:
causing, by an image pickup section, an image pickup optical system to form an optical image, and an image pickup device to photoelectrically convert the optical image formed by the image pickup optical system and generate first image data;
temporarily storing, by a storage section, the first image data picked up by the image pickup section or second image data picked up in a past;
displaying, by a display section, an image based on the first image data or the second image data stored in the storage section;
making a division instruction, by an operation section, that a region to be displayed on the display section is to be divided, and making a flick instruction that a reduced image of image data displayed on the display section;
detecting, by an attitude detection section, in which one of an attitude of a vertical position and a horizontal position the image pickup section performs photographing; and
causing, by a signal processing control section, a display control section to drive the display section, and an image processing section to perform image signal processing on the first image data or the second image data,
wherein the signal processing control section, in accordance with a result detected by the attitude detection section, performs display control of displaying, on the display section, an image based on the second image data that is temporarily stored in the storage section, and if the signal processing control section receives the division instruction from the dividing operation section, dividing a display region of the display section, causing second image data to be displayed in one of regions obtained by the division, and repeatedly updating/displaying first image data acquired by the image pickup section in a display region, of the display section, different from a display region of the second image, while when the signal processing control section receives the flick instruction from the operation section, causing the display section to display the first image data, and displaying in a superimposed manner a reduced image of the second image data at a display position set in advance.

15. An image pickup method comprising:
causing, by an image pickup section, an image pickup optical system to form an optical image, and an image pickup device to photoelectrically convert the optical image formed by the image pickup optical system and generate image data;
displaying, by a display section, an image based on the image data acquired by the image pickup section;
issuing, by an operation section, a predetermined operation instruction;
detecting, by an attitude detection section, in which one of an attitude of a vertical position and a horizontal position the image pickup section performs photographing;
temporarily storing, by a temporary storage section, the image data acquired by the image pickup section; and
causing, by a signal processing control section, a display control section to drive the display section, and an image processing section to perform image signal processing on the image data acquired by the image pickup section,
wherein the signal processing control section, in accordance with a result detected by the attitude detection section, performs display control of displaying, on the display section, an image based on the image data that is temporarily stored in the temporary storage section, and if the singnal processing control section receives a first predetermined operation on the operation section, performing a reduction process on the image that is displayed on the display section, displaying, on the display section, a reduced image reflecting a result of the reduction process, and successively updating/displaying an image that is acquired by the image pickup section in a marginal portion, other than a display region of the reduced image, on the display section, while if the signal processing control section receives a second predetermined operation from the operation section, causing the display section to display the first image data, and displaying in a superimposed manner a reduced image of the second image data at a display position set in advance.

16. A non-transitory computer-readable medium storing a program for causing a computer to execute an image pickup control process of:
causing, by an image pickup section, an image pickup optical system to form an optical image, and an image pickup device to photoelectrically convert the optical image formed by the image pickup optical system and generate first image data;
temporarily storing, by a storage section, the first image data picked up by the image pickup section or second image data picked up in a past;
displaying, by a display section, an image based on the first image data or the second image data stored in the storage section;
making a division instruction, by an operation section, that a region to be displayed on the display section is to be divided, and making a flick instruction that a reduced image of image data displayed on the display section;
detecting, by an attitude detection section, in which one of an attitude of a vertical position and a horizontal position the image pickup section performs photographing; and
causing, by a signal processing control section, a display control section to drive the display section, and an image processing section to perform image signal processing on the first image data or the second image data,
wherein the signal processing control section, in accordance with a result detected by the attitude detection section, performs display control of displaying, on the display section, an image based on the second image data that is temporarily stored in the storage section, and if the signal processing control section receives the division instruction from the dividing operation section, dividing a display region of the display section, causing second image data to be displayed in one of regions obtained by the division, and repeatedly updating/displaying first image data acquired by the image pickup section in a display region, of the display section, different from a display region of the second image, while when the signal processing control section receives the flick instruction from the operation section, causing the display section to display the first image data, and displaying in a superimposed manner a reduced image of the second image data at a display position set in advance.

17. A non-transitory computer-readable medium storing a program for causing a computer to execute an image pickup control process of:
causing, by an image pickup section, an image pickup optical system to form an optical image, and an image pickup device to photoelectrically convert the optical image formed by the image pickup optical system and generate image data;
displaying, by a display section, an image based on the image data acquired by the image pickup section;
issuing, by an operation section, a predetermined operation instruction;
detecting, by an attitude detection section, in which one of an attitude of a vertical position and a horizontal position the image pickup section performs photographing;
temporarily storing, by a temporary storage section, the image data acquired by the image pickup section; and
causing, by a signal processing control section, a display control section to drive the display section, and an image processing section to perform image signal processing on the image data acquired by the image pickup section,
wherein the signal processing control section, in accordance with a result detected by the attitude detection section, performs display control of displaying, on the display section, an image based on the image data that is temporarily stored in the temporary storage section, and if the signal processing control section receives a first predetermined operation on the operation section, performing a reduction process on the image that is displayed on the display section, displaying, on the display section, a reduced image reflecting a result of the reduction process, and successively updating/displaying an image that is acquired by the image pickup section in a marginal portion, other than a display region of the reduced image, on the display section, while if the signal processing control section receives a second predetermined operation from the operation section, causing the display section to display the first image data, and displaying in a superimposed manner a reduced image of the second image data at a display position set in advance.

\* \* \* \* \*